US012655916B2

(12) United States Patent
Newberg

(10) Patent No.: US 12,655,916 B2
(45) Date of Patent: Jun. 16, 2026

(54) DIAPHRAGM VALVE

(71) Applicant: Douglas Arthur Newberg, Cincinnati, OH (US)

(72) Inventor: Douglas Arthur Newberg, Cincinnati, OH (US)

( * ) Notice: Subject to any disclaimer, the term of this patent is extended or adjusted under 35 U.S.C. 154(b) by 0 days.

(21) Appl. No.: 18/228,009

(22) Filed: Jul. 31, 2023

(65) Prior Publication Data

US 2023/0375100 A1     Nov. 23, 2023

Related U.S. Application Data

(63) Continuation of application No. 16/973,677, filed as application No. PCT/US2019/036358 on Jun. 10, 2019, now Pat. No. 11,713,825.

(60) Provisional application No. 62/685,888, filed on Jun. 15, 2018, provisional application No. 62/683,006, filed on Jun. 10, 2018.

(51) Int. Cl.
*F16K 27/02*     (2006.01)
*F16K 7/16*     (2006.01)

(52) U.S. Cl.
CPC ............ *F16K 27/0236* (2013.01); *F16K 7/16* (2013.01)

(58) Field of Classification Search
CPC ... F16K 1/02; F16K 1/04; F16K 1/385; F16K 1/427; F16K 1/50; F16K 27/02; F16K 27/0236; F16K 27/0254; F16K 27/0281; F16K 31/504; F16K 31/508; F16K 41/10; F16K 41/103; F16K 41/12; F16K 41/14
See application file for complete search history.

(56) References Cited

U.S. PATENT DOCUMENTS

| | | | | |
|---|---|---|---|---|
| 1,654,550 | A | * | 1/1928 | Muend .................... F16K 27/12 |
| | | | | 137/359 |
| 3,339,808 | A | * | 9/1967 | Sterns .................... B65G 65/44 |
| | | | | 222/196 |
| 3,399,695 | A | * | 9/1968 | Stehlin .................. F16K 41/103 |
| | | | | 137/551 |
| 3,417,960 | A | * | 12/1968 | Stehlin .................. F16K 31/143 |
| | | | | 251/14 |

(Continued)

FOREIGN PATENT DOCUMENTS

| | | | | | |
|---|---|---|---|---|---|
| GB | 660970 | A | * | 11/1951 | ............. F16K 1/385 |
| GB | 720211 | A | * | 12/1954 | |

(Continued)

*Primary Examiner* — Hailey K. Do

(74) *Attorney, Agent, or Firm* — FBT Gibbons LLP

(57)     ABSTRACT

A fitting assembly includes a fitting body and a valve assembly. The valve assembly includes a hollow pedestal, an actuator shaft, and a sealing member. The hollow pedestal includes upper and lower ends. The hollow pedestal is disposed in a valve opening defined by the fitting body such that the upper end is disposed in a passageway defined by the fitting body and the lower end is external to the passageway. The actuator shaft is disposed in the hollow pedestal and is movably coupled with the hollow pedestal. The sealing member is coupled with the actuator shaft adjacent the upper end and at least partially movable together with the actuator shaft. The sealing member is configured to selectively interface with an upper valve body to provide a seal therebetween. The fitting body and the hollow pedestal are formed of a multipiece construction and are joined together at the valve opening.

16 Claims, 15 Drawing Sheets

(56) References Cited

U.S. PATENT DOCUMENTS

| | | | | |
|---|---|---|---|---|
| 5,906,048 A | * | 5/1999 | Bender | ................. F16L 47/345 |
| | | | | 137/5 |
| 2007/0114484 A1 | * | 5/2007 | Newberg | ............ F16K 27/0254 |
| | | | | 251/335.3 |

FOREIGN PATENT DOCUMENTS

| | | | | | | |
|---|---|---|---|---|---|---|
| GB | | 1357302 | A | * | 6/1974 | |
| GB | | 1381819 | A | * | 7/1975 | ............. F16K 41/10 |
| WO | WO-2006071807 | A2 | * | 7/2006 | | ............. F16K 27/07 |

* cited by examiner

DIAPHRAGM VALVE

REFERENCE TO RELATED APPLICATIONS

This application is a continuation of U.S. patent application Ser. No. 16/973,677, filed Dec. 9, 2020, entitled Diaphragm Valve, which is a U.S. national stage application of International App. Serial No. PCT/US2019/036358, entitled Diaphragm Valve, filed Jun. 10, 2019, which claims priority of U.S. provisional patent application Ser. No. 62/683,006, entitled Diaphragm Valve, filed Jun. 10, 2018, and U.S. provisional patent application Ser. No. 62/685,888, entitled Light Weight Diaphragm Outlet Valve with Externally Mounted Diaphragm and Actuator, filed Jun. 15, 2018, and hereby incorporates these applications by reference herein in their respective entireties.

TECHNICAL FIELD

The apparatus and methods described below generally relate to a fitting assembly that includes a fitting body and a valve assembly having a hollow pedestal. The fitting body and the hollow pedestal are formed of a multi-piece construction that are joined together.

BACKGROUND

Conventional containment vessels, such as fluid tanks, include an upper valve body at a bottom of the containment vessel that is coupled with a fitting assembly. The fitting assembly includes a valve assembly that is operable to selectively drain the contents of the containment vessel through the upper valve body. These fitting assemblies are typically formed of machined or cast material which can be heavy, cumbersome, and expensive.

BRIEF DESCRIPTION OF THE DRAWINGS

Various embodiments will become better understood with regard to the following description, appended claims and accompanying drawings wherein:

DETAILED DESCRIPTION

Figures 1, 2:
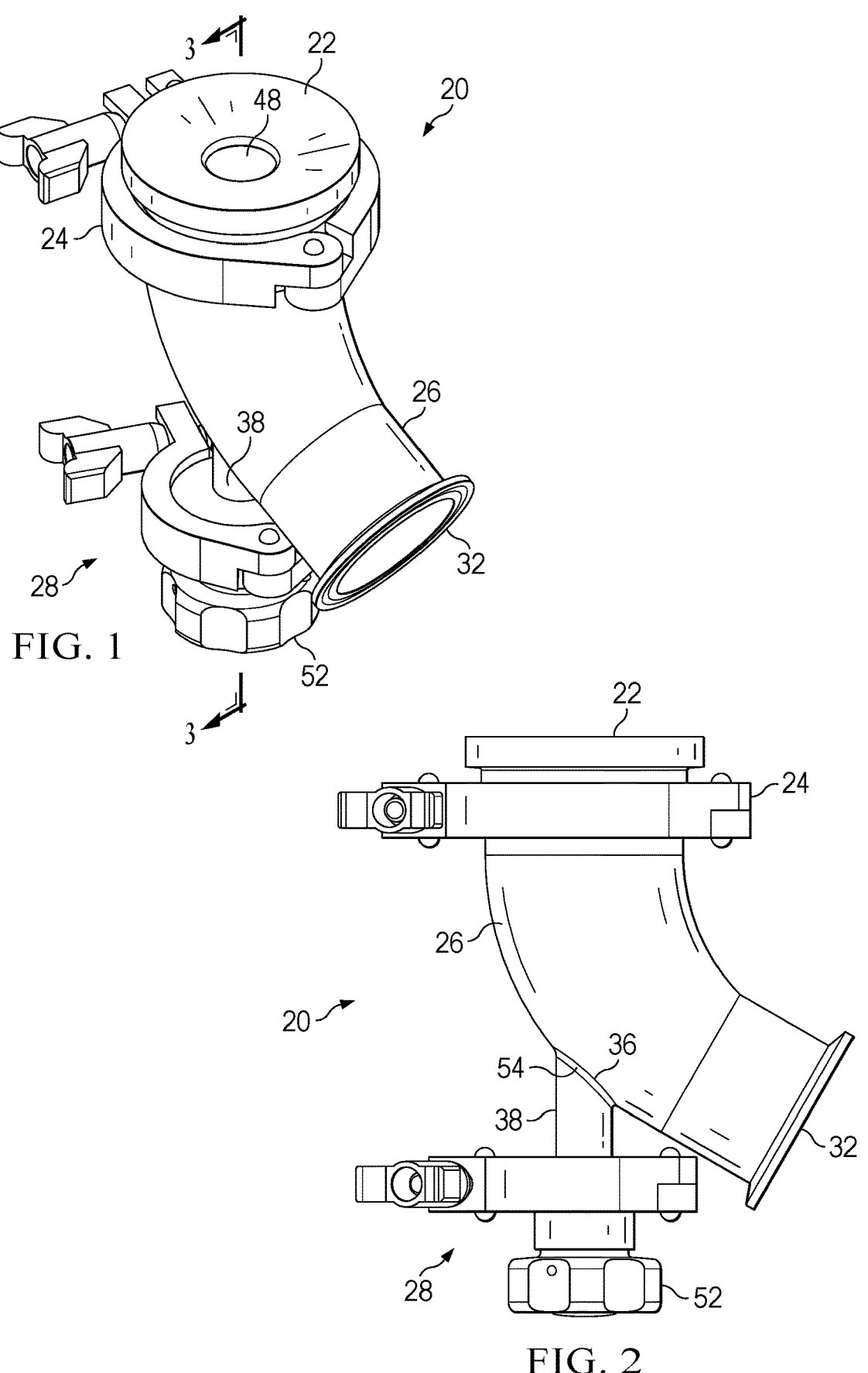
FIG. 1 is an isometric view depicting a fitting assembly in association with an upper valve body, in accordance with one embodiment.
FIG. 2 is a side view of the fitting assembly and the upper valve body of FIG. 1.
Figure 3:
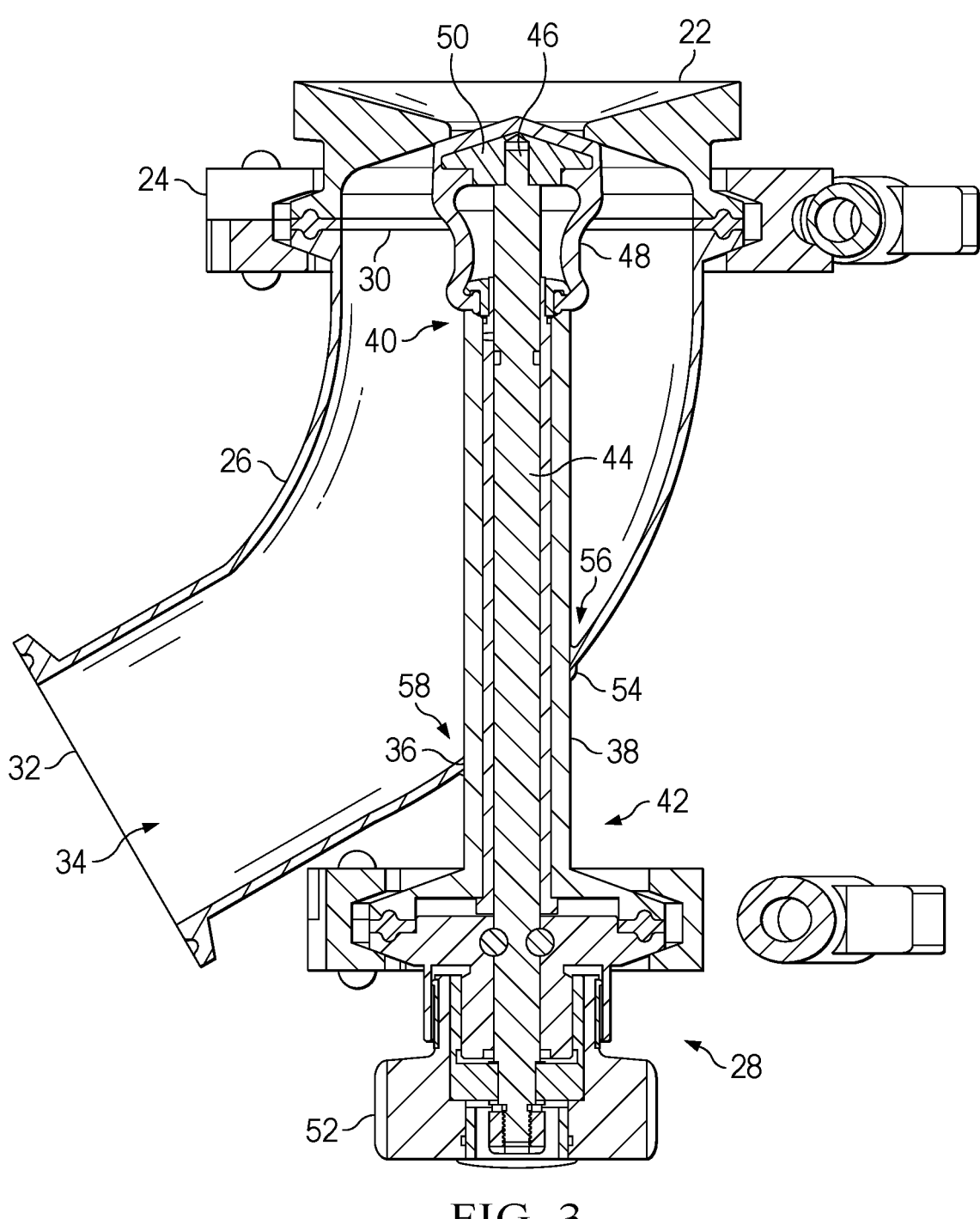
FIG. 3 is a cross sectional view taken along the line 3-3 in FIG. 1.

Embodiments are hereinafter described in detail in connection with the views and examples of FIGS. 1-20, wherein like numbers indicate the same or corresponding elements throughout the views. FIGS. 1-3 illustrate a fitting assembly 20 that is coupled with an upper valve body 22 by a clamp 24 or any of a variety of suitable alternative securement arrangements. The upper valve body 22 can be associated with a containment vessel (not shown) such as a fluid tank or with a section of conduit/piping (not shown). The fitting assembly 20 can include a fitting body 26 and a valve assembly 28 that is associated with the fitting body 26. The valve assembly 28 can facilitate selective draining of fluid from the containment vessel or conduit/piping associated with the upper valve body 22 through the fitting body 26. The fitting assembly 20 can be utilized in aseptic processes where preventing contamination of fluids is of particular importance, such as pharmaceutical manufacturing and food and beverage processing, for example. Various example features and functionality of the valve assembly 28 that are not otherwise discussed herein can be found in U.S. Pat. No. 6,491,283 which is hereby incorporated by reference herein in its entirety.

Referring now to FIG. 3, the fitting body 26 can define a fluid inlet 30, a fluid outlet 32, and a passageway 34 that extends between the fluid inlet 30 and fluid outlet 32. When the valve assembly 28 is operated to drain fluid contained by the upper valve body 22, the fluid can flow through the upper valve body 22, through the fluid inlet 30, along the passageway 34, and out of the fluid outlet 32. A drain conduit (not shown) can be coupled with the fitting body 26 at the fluid outlet 32 to facilitate delivery of the fluid to an appropriate location.

The fitting body 26 can also define a valve opening 36 that is disposed between the fluid inlet 30 and the fluid outlet 32 and is configured to accommodate the valve assembly 28. The valve assembly 28 can include a hollow pedestal 38 that includes an upper end 40 and a lower end 42. The hollow pedestal 38 can be disposed in the valve opening 36 such that the upper end 40 is disposed in the passageway 34 and the lower end 42 is external to the passageway 34. An actuator shaft 44 can be disposed in the hollow pedestal 38 and can include a tip portion 46. A sealing member 48 can be coupled with the upper end 40 of the hollow pedestal 38 and can surround the tip portion 46 of the actuator shaft 44. The upper end 40 and the sealing member 48 can cooperate to provide a sealed interface therebetween to prevent the tip portion 46 of the actuator shaft 44 from being exposed to fluid in the passageway 34. The tip portion of the actuator shaft 44 can be coupled with the sealing member 48 via a stud 50 that is molded or otherwise coupled with the sealing member 48. It is to be appreciated that although the sealing member 48 is shown to be a diaphragm, any of a variety of suitable alternative sealing arrangements are contemplated.

The actuator shaft 44 can be slidably coupled with the hollow pedestal 38 such that the actuator shaft 44 is slidable between an extended position (shown in FIG. 3) and a retracted position (not shown). When the actuator shaft 44 is in the extended position, as illustrated in FIG. 3, the sealing member 48 interfaces with the upper valve body 22 to create an effective seal therebetween. The sealing member 48 can be formed of an elastomeric material, such as rubber, that is compressed between the upper valve body 22 and the stud 50 to create a seal between the upper valve body 22 and the stud 50. When the actuator shaft 44 is moved into the retracted position, the tip portion 46 can be pulled downwardly which can pull the sealing member 48 away from the upper valve body 22 (via the stud 50) to allow fluid to pass through the upper valve body 22 and into the passageway 34.

Still referring to FIG. 3, a handle 52 can be operably coupled with the actuator shaft 44 adjacent the lower end 42 of the hollow pedestal 38 and operable to facilitate manual sliding of the actuator shaft 44 (e.g., by a user's hand) between the extended position and the retracted position. In one embodiment, the handle 52 can be threadably coupled with the hollow pedestal 38. In such an embodiment, rotation of the handle 52 can facilitate sliding of the actuator shaft 44 between the extended position and the retracted position. It is to be appreciated that any of a variety of suitable alternative actuators can be provided such as, for example, a motorized actuator that facilitates automated movement of the actuator shaft 44 between the extended position and the retracted position. It is also to be appreciated that although the actuator shaft 44 is described as being slidably coupled with the hollow pedestal 38, the actuator shaft 44 can be movably coupled with the hollow pedestal 38 in any of a variety of suitable alternative arrangements, such as rotatably coupled, for example.

During construction of the fitting assembly 20, the fitting body 26 and the hollow pedestal 38 can initially be provided as two separate components with the valve opening 36 preformed in the fitting body 26. The hollow pedestal 38 can then be inserted into the valve opening 36 and, the fitting body 26 and the hollow pedestal 38 can be joined together at the valve opening 36. In one embodiment, as illustrated in FIGS. 1-3, the fitting body 26 and the hollow pedestal 38 can be directly welded together (e.g., via TIG welding, MIG welding, or brazing) to form a weld bead 54 at the valve opening 36. In such an embodiment, the weld bead 54 can be smoothed within the passageway 34, such as through a grinding process with a grinder (e.g., see locations 56 and 58 in FIG. 3), to provide a smoother surface that allows fluid to easily drain away from the weld bead 54 within the passageway 34. In another embodiment, the fitting body 26 and the hollow pedestal 38 can be formed together through an additive process, such as a three-dimensional printing process. By providing the fitting body 26 and the hollow pedestal 38 as a multi-piece construction joined together or formed via an additive process in this manner, the fitting assembly 20 can be more light weight and less expensive than conventional fitting assemblies that are manufactured via a subtractive process (e.g., CNC machining). Since the fitting assembly 20 is more lightweight, the fitting assembly 20 can be less susceptible to causing damage to the upper valve body 22 when suspended from the upper valve body 22 during use. The fitting assembly 20 can also be less cumbersome and easier to install on the upper valve body 22. It is to be appreciated that although the fitting body 26 is illustrated to be an elbow-type fitting, any of a variety of suitable alternative fitting body arrangements can be provided, such as for example, a different two-way fitting, a three-way fitting (e.g., a T-shaped fitting), or a four-way fitting, for example.

Figure 4:
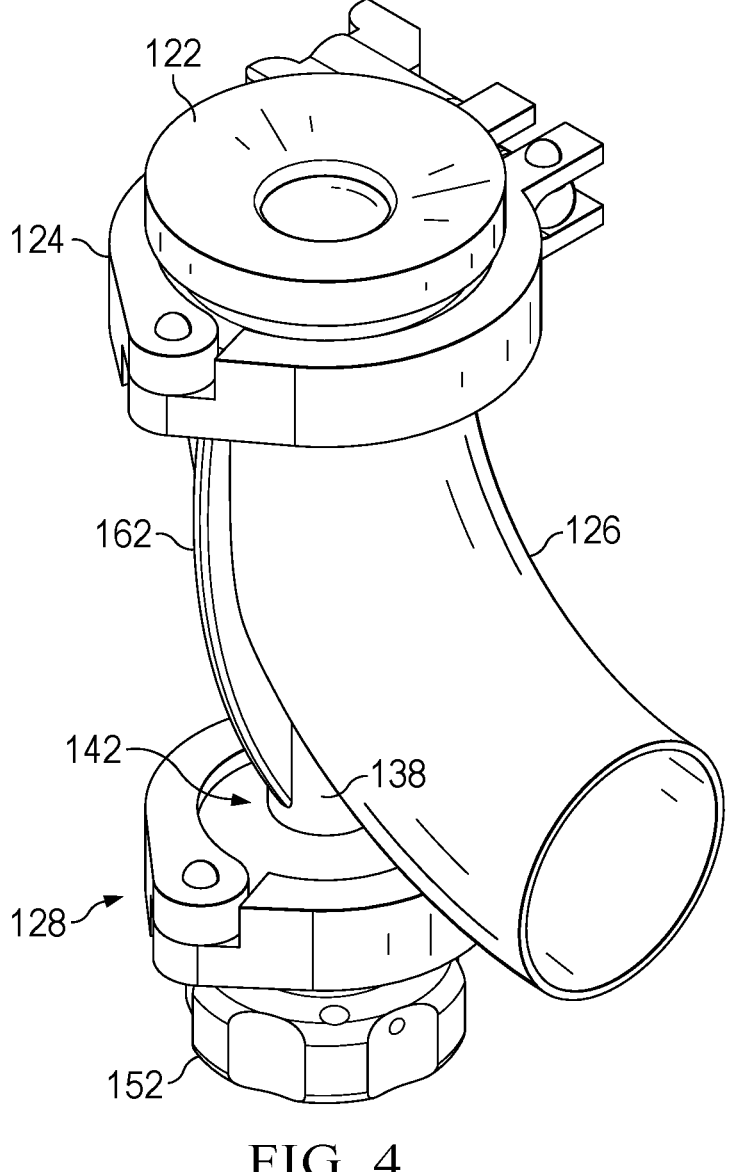
FIG. 4 is an upper isometric view depicting a fitting assembly in association with an upper valve body, in accordance with another embodiment.
Figures 5, 6:
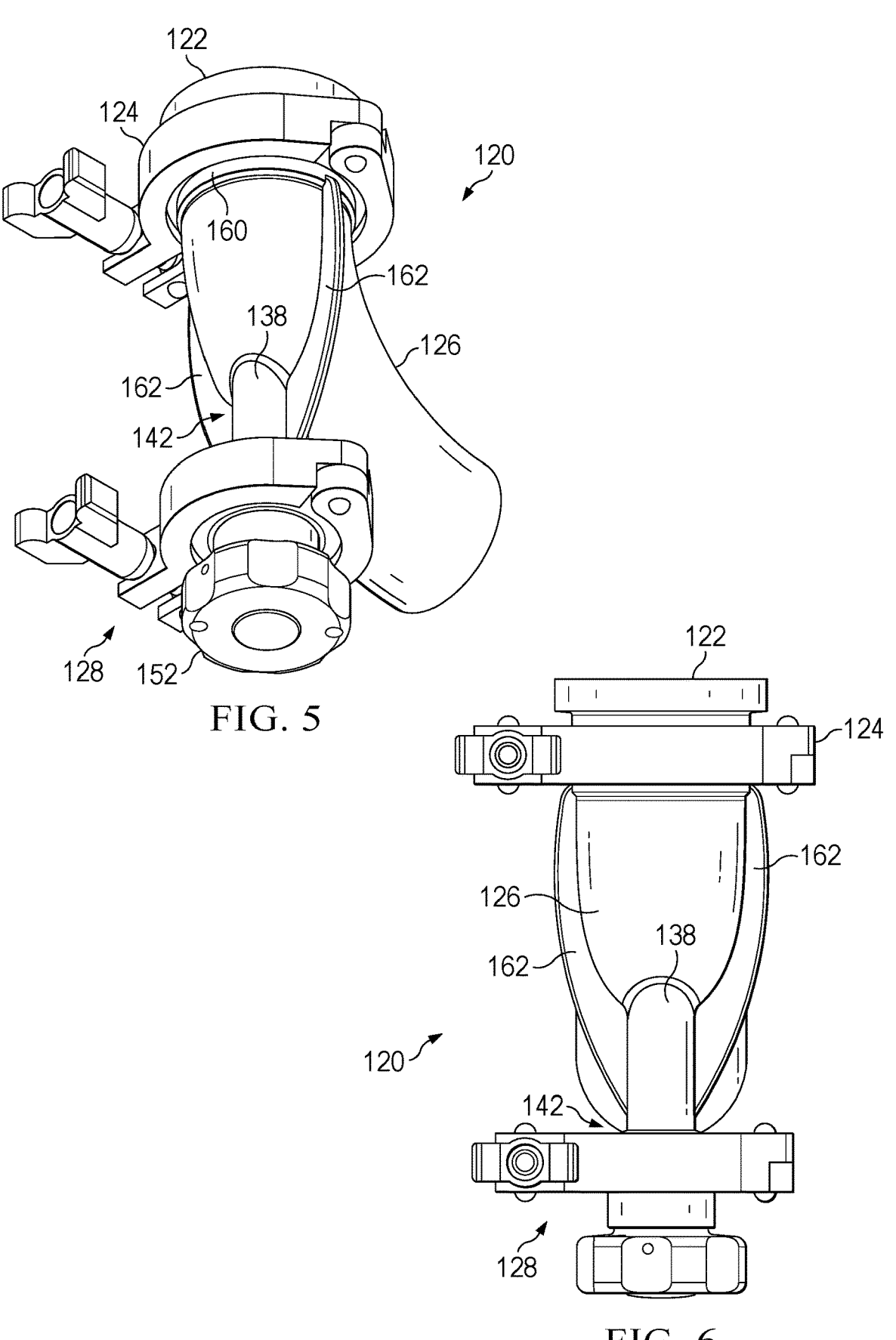
FIG. 5 is a lower isometric view depicting the fitting assembly and the upper valve body of FIG. 4.
FIG. 6 is a rear view of the fitting assembly and the upper valve body of FIG. 4.

An alternative embodiment of a fitting assembly 120 is illustrated in FIGS. 4-6 and can be similar to, or the same in many respects as, the fitting assembly 20 illustrated in FIGS. 1-3. For example, the fitting assembly 120 can include a fitting body 126 and a valve assembly 128. The valve assembly 128 can include a hollow pedestal 138 that is joined with the fitting body 126 (e.g., via welding). A handle 152 can be disposed at a lower end 142 of the hollow pedestal 138. However, as illustrated in FIG. 5, the fitting body 126 can include a collar 160 that can be grasped by a clamp 124 to facilitate coupling of the fitting body 126 with an upper valve body 122. The collar 160 can be thicker than the rest of the fitting body 126 to provide additional structural rigidity for the attachment to the upper valve body 122. As illustrated in FIGS. 4-6, the fitting assembly 120 can also include a pair of rib members 162 that are disposed on opposite sides of the fitting body 126 and extend between the collar 160 and the lower end 142 of the hollow pedestal 138. Each of the rib members 162 can be coupled with the fitting body 126, the lower end 142 of the hollow pedestal 138, and the collar 160 and can provide structural rigidity to the lower end 142. For example, when a user rotates the handle 152 (e.g., to open or close the valve assembly 128), the forces imparted on the lower end 142 from the rotation of the handle 152 can be at least partially transferred to the collar 160 such that the lower end 142 can be less susceptible to breaking during rotation of the handle 152. In one embodiment, the rib members 162 can be welded with the fitting body 126, the lower end 142 of the hollow pedestal 138, and the collar 160. It is to be appreciated that although a pair of rib members 162 are shown and described, any of a variety of suitable alternative reinforcement members can be provided in addition to or in lieu of the rib members 162.

Figures 7A, 8:
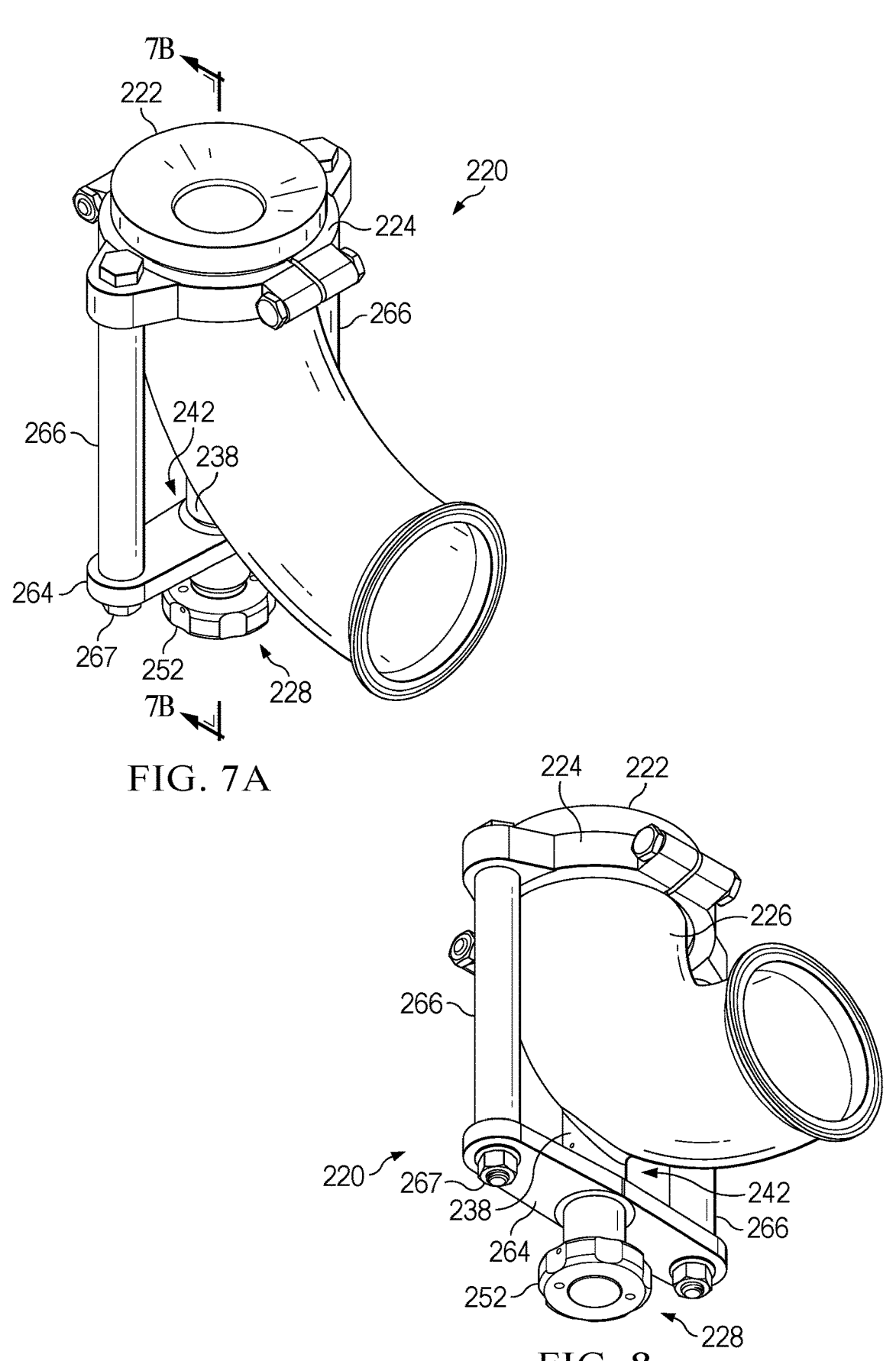
FIG. 7A is an upper isometric view depicting a fitting assembly in association with an upper valve body, in accordance with yet another embodiment.
FIG. 8 is a lower isometric view depicting the fitting assembly and the upper valve body of FIG. 7A.
Figure 7B:
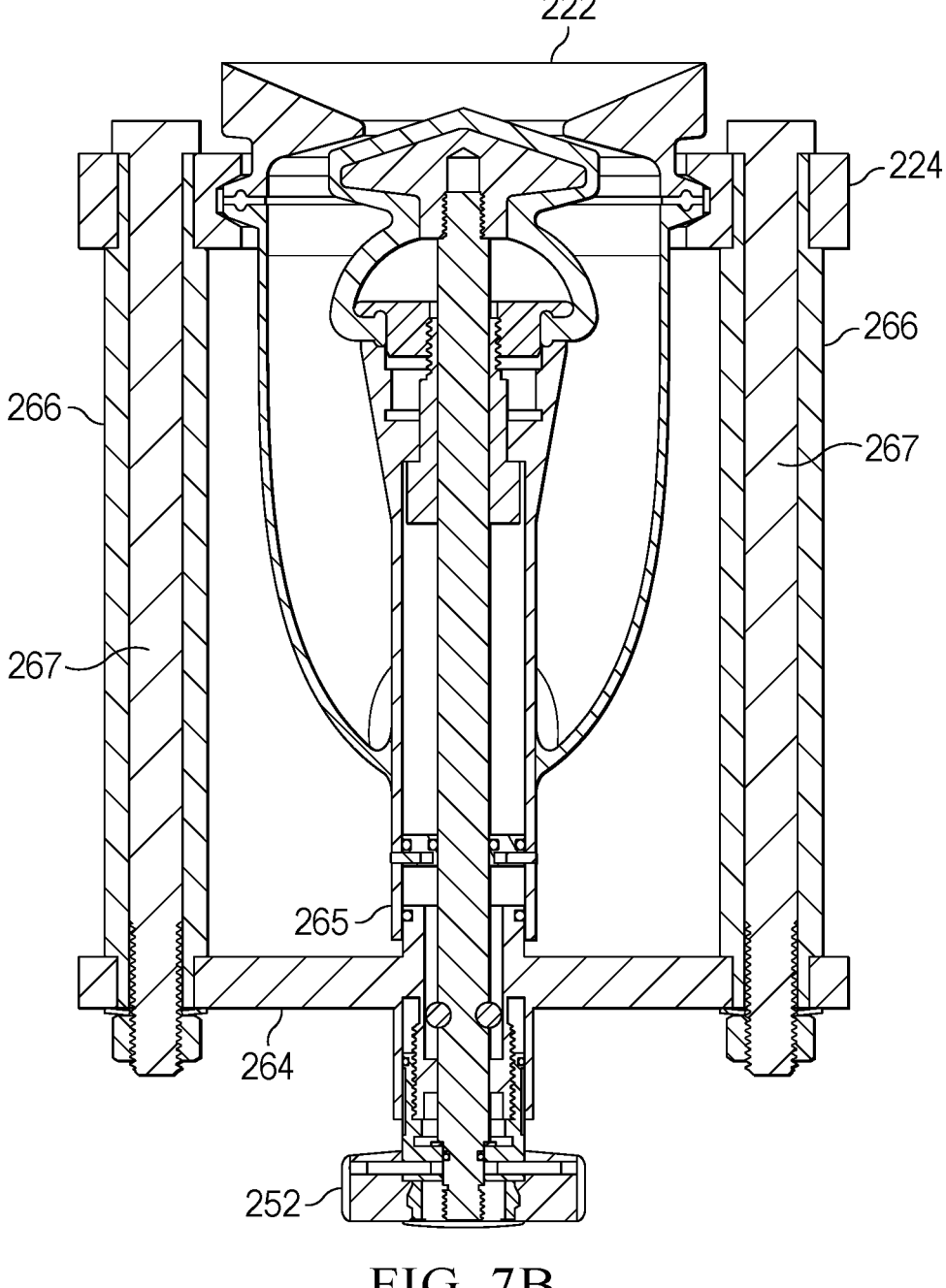
FIG. 7B is a cross sectional view taken along the line 7B-7B in FIG. 7A.

An alternative embodiment of a fitting assembly 220 is illustrated in FIGS. 7A, 7B, and 8 and can be similar to, or the same in many respects as, the fitting assembly 20 illustrated in FIGS. 1-3. For example, the fitting assembly 220 can include a fitting body 226 and a valve assembly 228. The valve assembly 228 can include a hollow pedestal 238 and an actuator shaft 244 (FIG. 7B). A handle 252 can be disposed at a lower end 242 of the hollow pedestal 238 and operably coupled with the actuator shaft 244. The fitting body 226 can be secured to an upper valve body 222 with a clamp 224. However, the fitting assembly 220 can include a flange 264 that is coupled with the lower end 242 of the hollow pedestal 238. The flange 264 can include a collar member 265 that extends into the hollow pedestal 238. The handle 252 can be rotatably coupled with the flange 264. A pair of sleeve members 266 can be disposed on opposing sides of the fitting body 226. Each of the sleeve members 266 can be coupled with each of the clamp 224 and the flange 264 with fasteners 267 such that there is a substantially rigid connection between clamp 224 and the flange 264. In one embodiment, each sleeve member 266 and fastener 267 can be separate components. In another embodiment, each sleeve member 266 can be integrally formed together with the fastener 267 (e.g., in a one-piece arrangement). When the handle 252 is rotated to actuate the actuator shaft 244, the force necessary to cause the actuator shaft 244 to actuate can be transmitted through the flange 264, through the sleeve members 266, through the clamp 224 and to the upper valve body 222 instead of being transmitted through the hollow pedestal 238. As such, the hollow pedestal 238 is less susceptible to failure (e.g., due to excessive forces imparted to the hollow pedestal 238) during actuation of the handle 252 and actuator shaft 244. It is to be appreciated that although the sleeve members 266 are shown as being secured to the clamp 224 and the flange 264, any of a variety of suitable alternative respective upper and lower braces can be provided. It is also to be appreciated that any of a variety of suitable alternative bracing arrangements can be provided for transferring forces at the handle 252 (or other actuator) away from the hollow pedestal 238 and to the fitting body 226 and/or the upper valve body 222.

Figure 9:
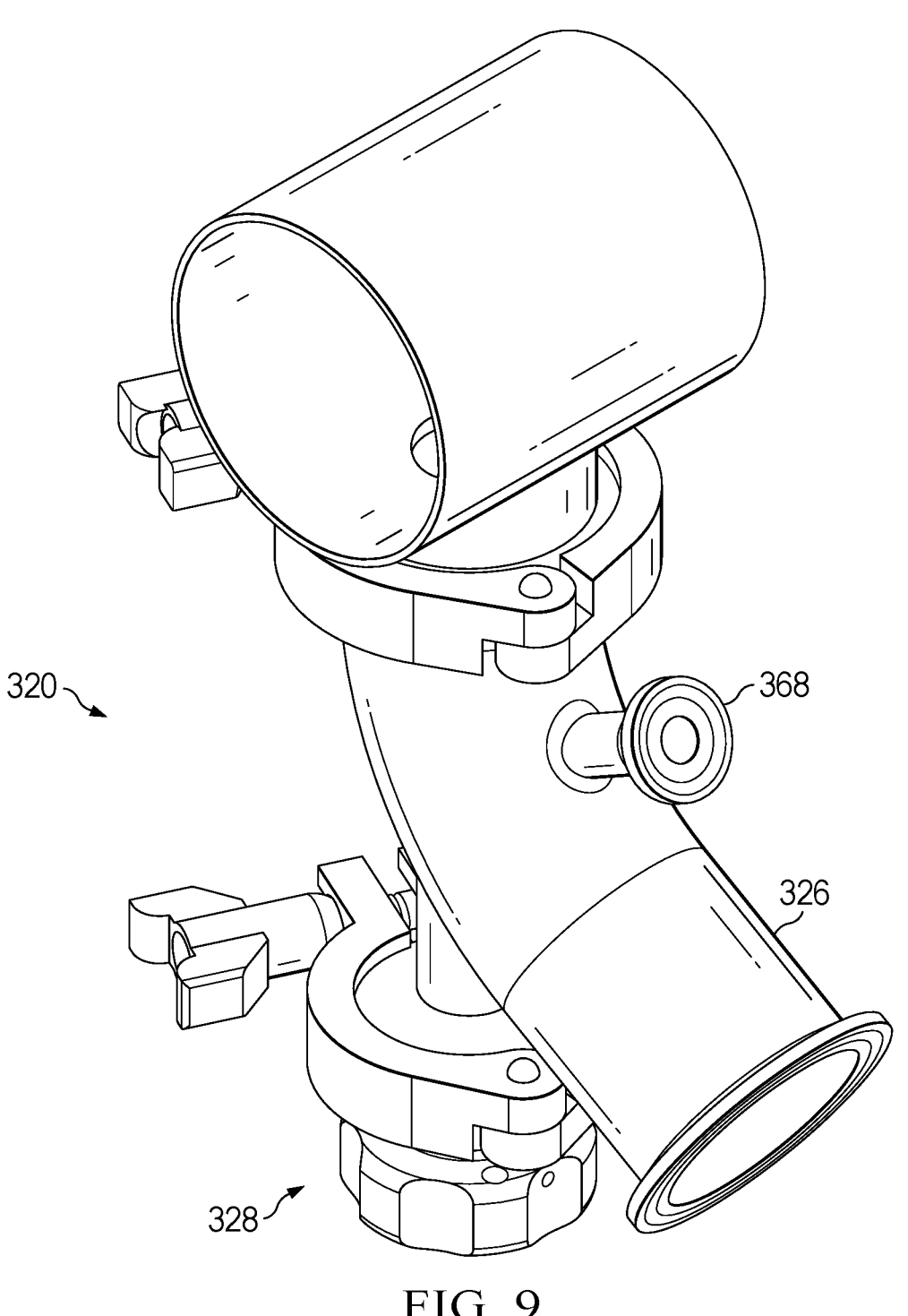
FIG. 9 is an upper isometric view depicting a fitting assembly in association with an upper valve body, in accordance with still yet another embodiment.

An alternative embodiment of a fitting assembly 320 is illustrated in FIG. 9 and can be similar to, or the same in many respects as, the fitting assembly 20 illustrated in FIGS. 1-3. For example, the fitting assembly 320 can include a fitting body 326 and a valve assembly 328. However, the fitting body 326 can include a port 368 that provides for external fluid access to a passageway of the fitting body 326.

Figure 10:
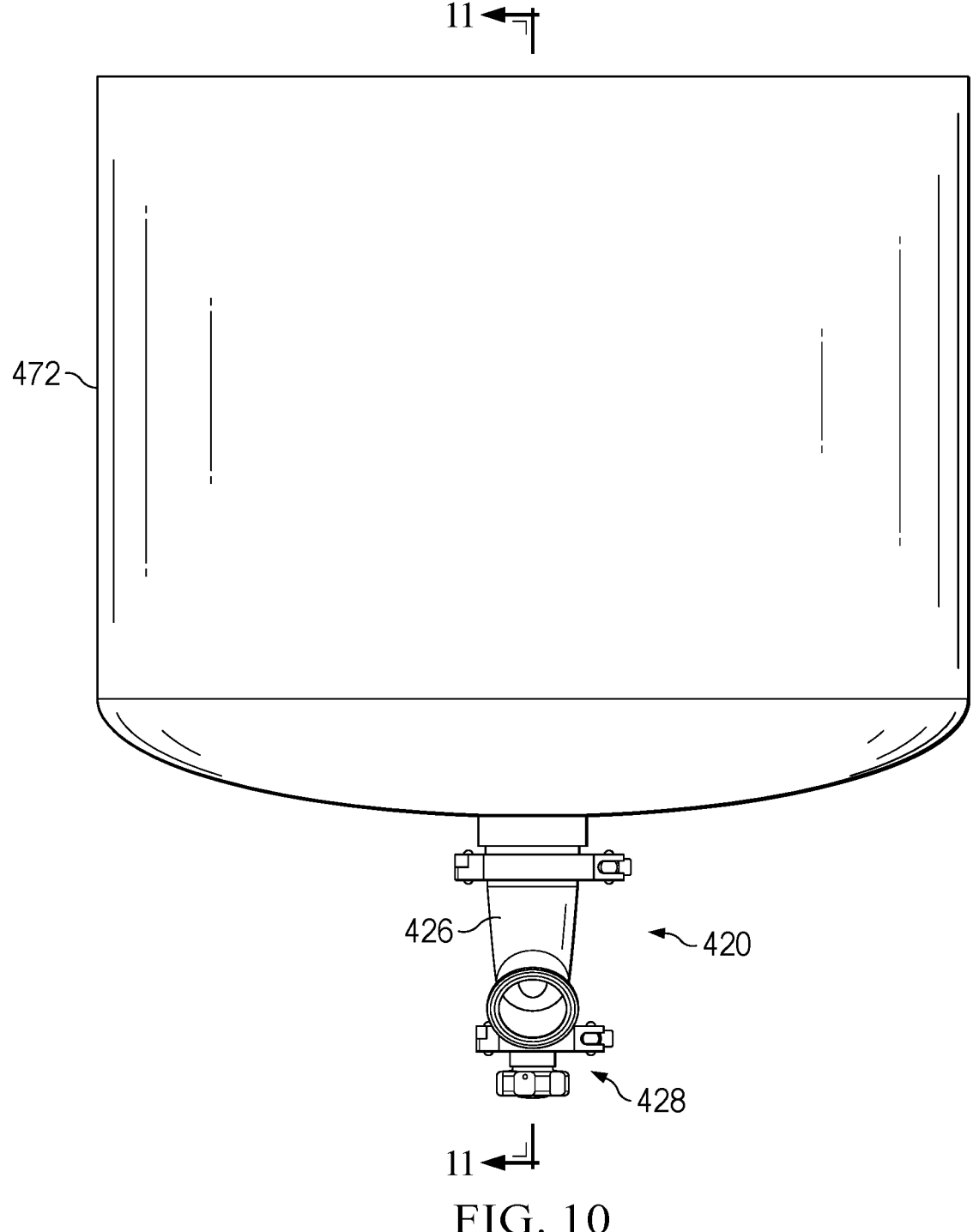
FIG. 10 is a front view depicting a fitting assembly in association with an upper valve body of a containment vessel, in accordance with still yet another embodiment.
Figure 11:
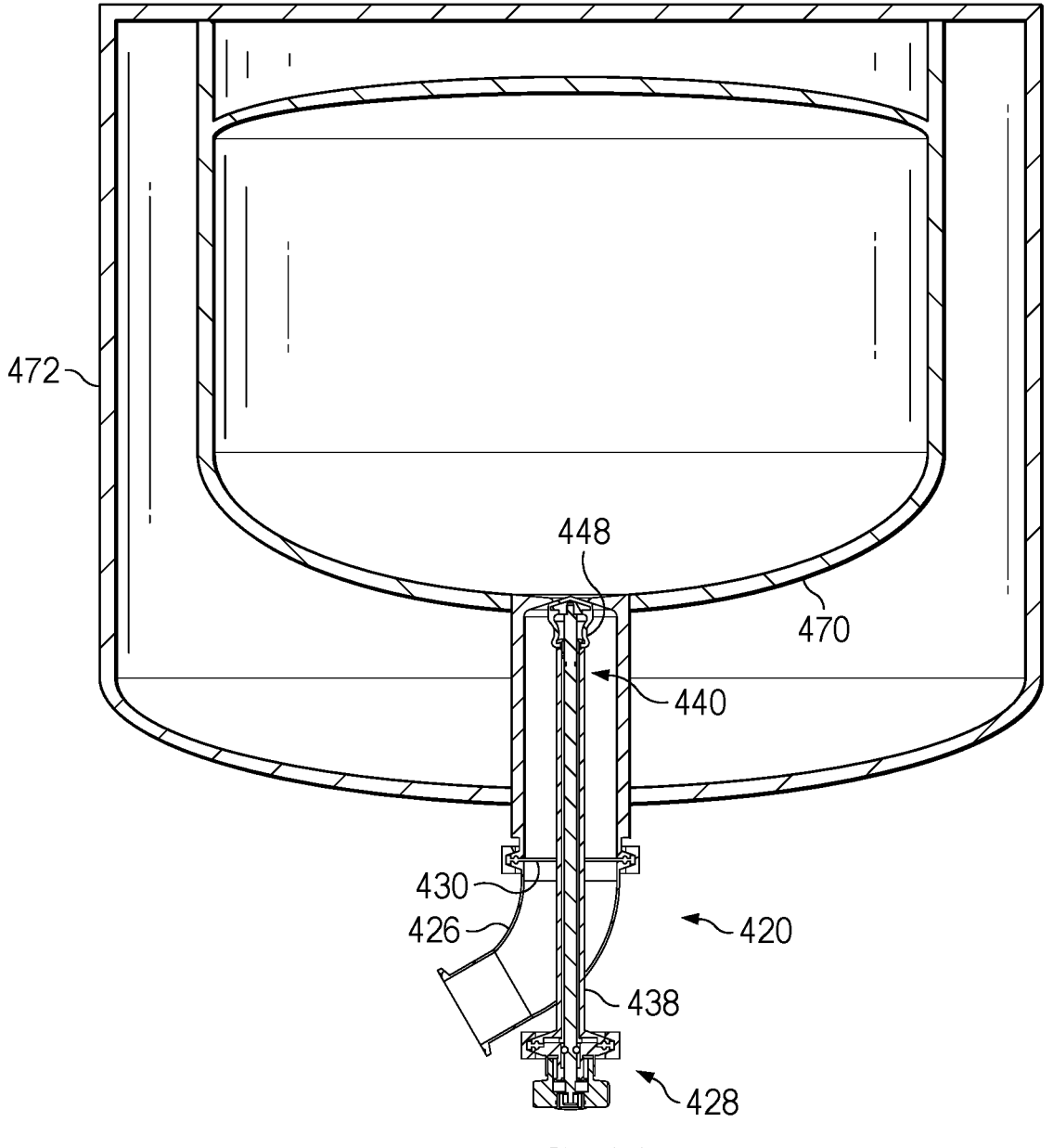
FIG. 11 is a cross sectional view taken along the line 11-11 in FIG. 10.

An alternative embodiment of a fitting assembly 420 is illustrated in FIGS. 10 and 11 and can be similar to, or the same in many respects as, the fitting assembly 20 illustrated in FIGS. 1-3. For example, the fitting assembly 420 can include a fitting body 426 and a valve assembly 428. As illustrated in FIG. 11, the valve assembly 428 can include a hollow pedestal 438 that includes an upper end 440 and a sealing member 448 attached thereto. However, the upper end 440 can extend beyond a fluid inlet 430 of the fitting body 426 such that it is adjacent to an inner chamber 470 of a cryogenic dewar 472.

Figures 12, 13:
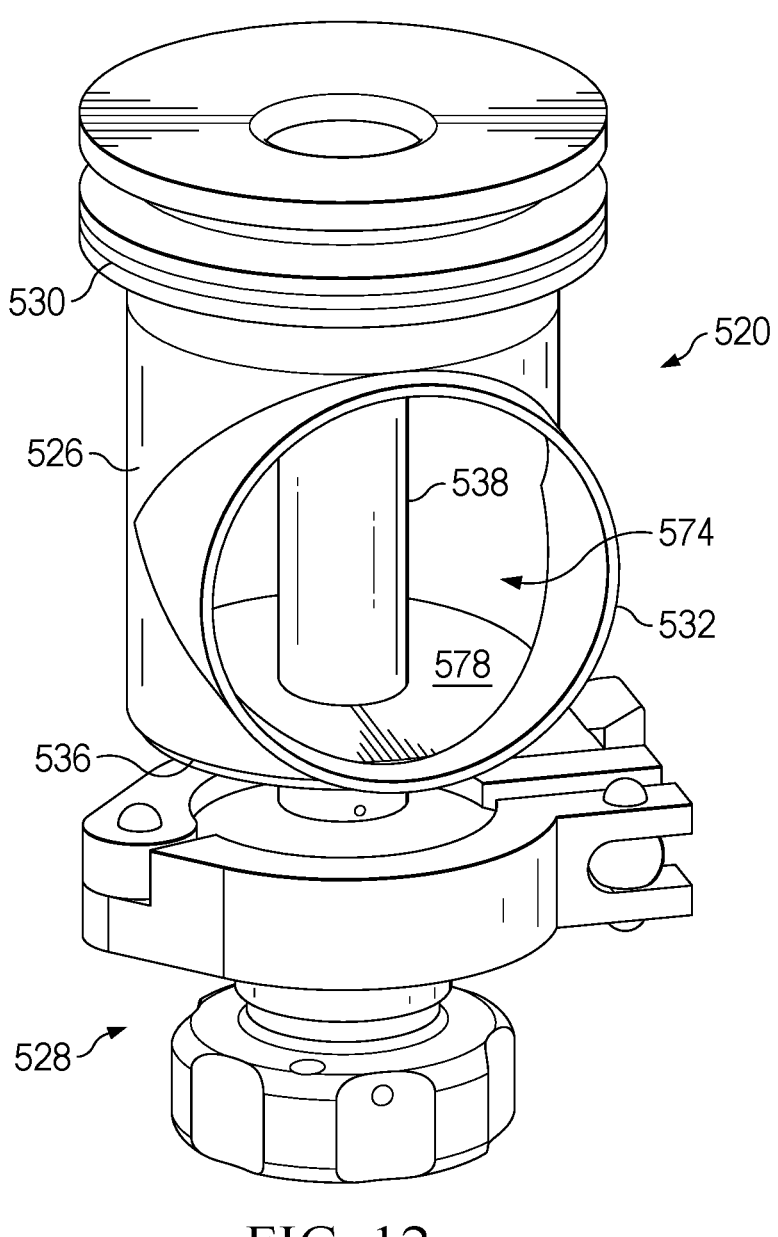
FIG. 12 is an isometric view depicting a fitting assembly in association with an upper valve body, in accordance with still yet another embodiment.
FIG. 13 is a side view of a weld plate of the fitting assembly of FIG. 12.

An alternative embodiment of a fitting assembly 520 is illustrated in FIGS. 12 and 13 and can be similar to, or the same in many respects as, the fitting assembly 20 illustrated in FIGS. 1-3. For example, as illustrated in FIG. 12, the fitting assembly 520 can include a fitting body 526 and a valve assembly 528. The fitting body 526 can define a fluid inlet 530 and a fluid outlet 532 such that the fitting body 526 is a two-way fitting. The valve assembly 528 can include a hollow pedestal 538. However, as illustrated in FIGS. 12 and 13, the valve assembly 528 can include a weld plate 574 that facilitates joining of the hollow pedestal 538 to the fitting body 526 (e.g., via welding). The weld plate 574 can define an aperture 576 (FIG. 13) through which the hollow pedestal 538 can be inserted. The hollow pedestal 538 can be joined to the weld plate 574 (e.g., through welding). The weld plate 574 can be provided in a valve opening 536 and joined to the fitting body 526 at the valve opening 536 (e.g., through welding). As illustrated in FIG. 13, the weld plate 574 can have an upper surface 578 that generally slopes in one direction such that the weld plate 574 has a substantially wedge-shaped cross section. The weld plate 574 can be arranged in the fitting body 526 such that the upper surface 578 slopes towards the fluid outlet 532 to facilitate effective draining of fluid off of the weld plate 574 towards the fluid outlet 532.

Figures 14, 15:
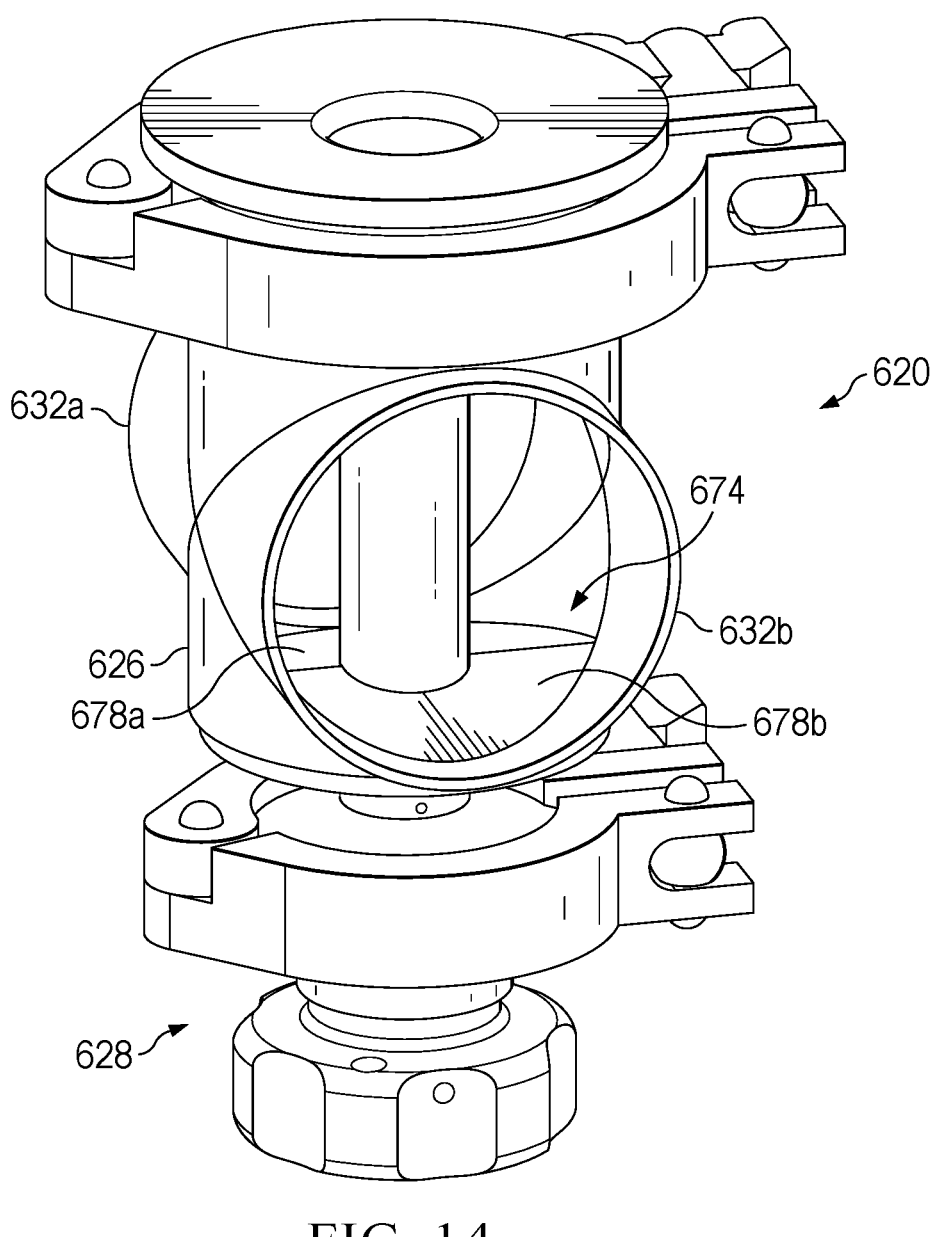
FIG. 14 is an isometric view depicting a fitting assembly in association with an upper valve body, in accordance with still yet another embodiment.
FIG. 15 is a side view of a weld plate of the fitting assembly of FIG. 14.

An alternative embodiment of a fitting assembly 620 is illustrated in FIGS. 14 and 15 and can be similar to, or the same in many respects as, the fitting assembly 520 illustrated in FIGS. 12 and 13. For example, as illustrated in FIG. 14, the fitting assembly 620 can include a fitting body 626, a valve assembly 628, and a weld plate 674. However, the fitting body 626 can define a fluid inlet (not shown) and a pair of fluid outlets 632a, 632b such that the fitting body 626 is a three-way fitting. Referring to FIG. 15, the weld plate 674 can have a pair of upper surfaces 678a, 678b that generally slope in opposite directions such that the weld plate 674 has a substantially triangular-shaped cross section. The weld plate 674 can be arranged in the fitting body 626 such that the upper surfaces 678a, 678b each slope towards respective ones of the fluid outlets 632a, 632b to facilitate effective draining of fluid off of the weld plate 674 towards the fluid outlets 632a, 632b. It is to be appreciated that the fitting body 626 can initially be provided as a four-way fitting that is effectively converted to a three-way fitting through the addition of the weld plate 674.

Figure 16:
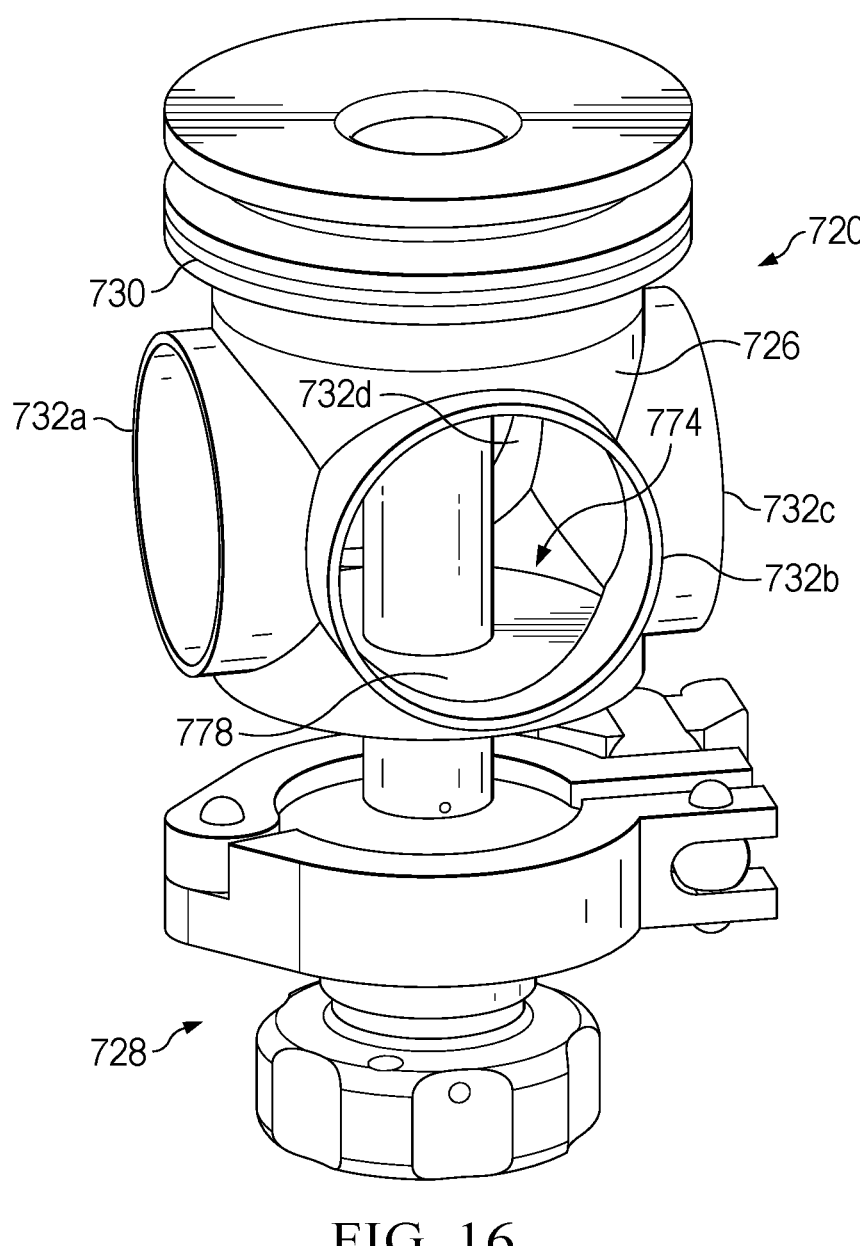
FIG. 16 is an isometric view depicting a fitting assembly in association with an upper valve body, in accordance with still yet another embodiment.
Figure 17:
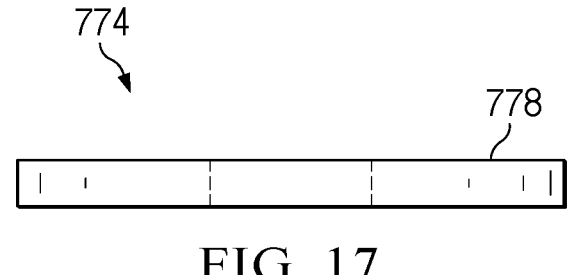
FIG. 17 is a side view of a weld plate of the fitting assembly of FIG. 16.

An alternative embodiment of a fitting assembly 720 is illustrated in FIGS. 16 and 17 and can be similar to, or the same in many respects as, the fitting assembly 520 illustrated in FIGS. 12 and 13. For example, as illustrated in FIG. 16, the fitting assembly 720 can include a fitting body 726, a valve assembly 728, and a weld plate 774. However, the fitting body 726 can define a fluid inlet 730 and four fluid outlets 732a, 732b, 732c, 732d such that the fitting body 726 is a five-way fitting. The weld plate 774 can have a substantially flat upper surfaces 778 such that the weld plate 774 has a substantially flat-shaped cross section.

Figure 18:
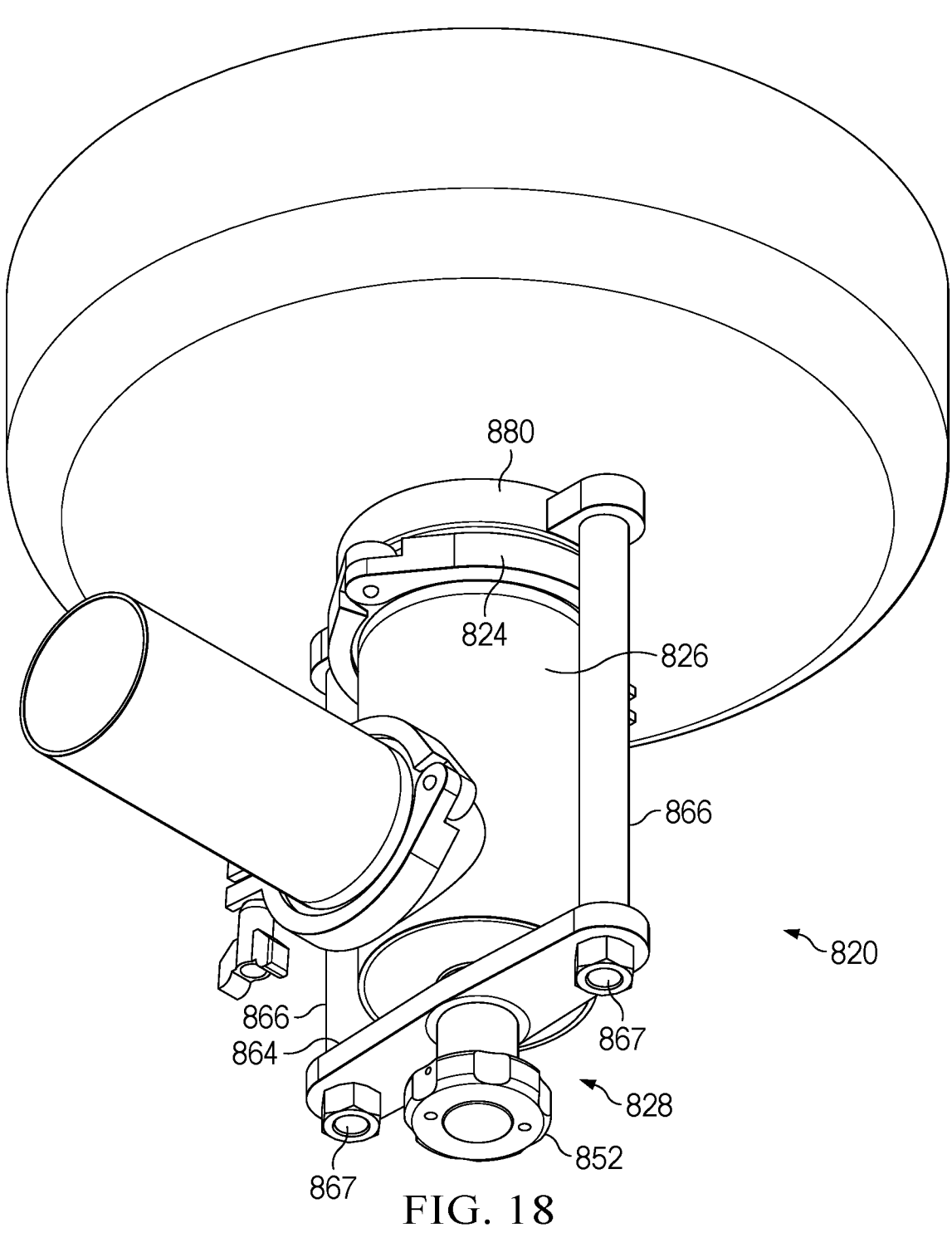
FIG. 18 is a lower isometric view depicting a fitting assembly in association with an upper valve body of a containment vessel, in accordance with still yet another embodiment.
Figure 19:
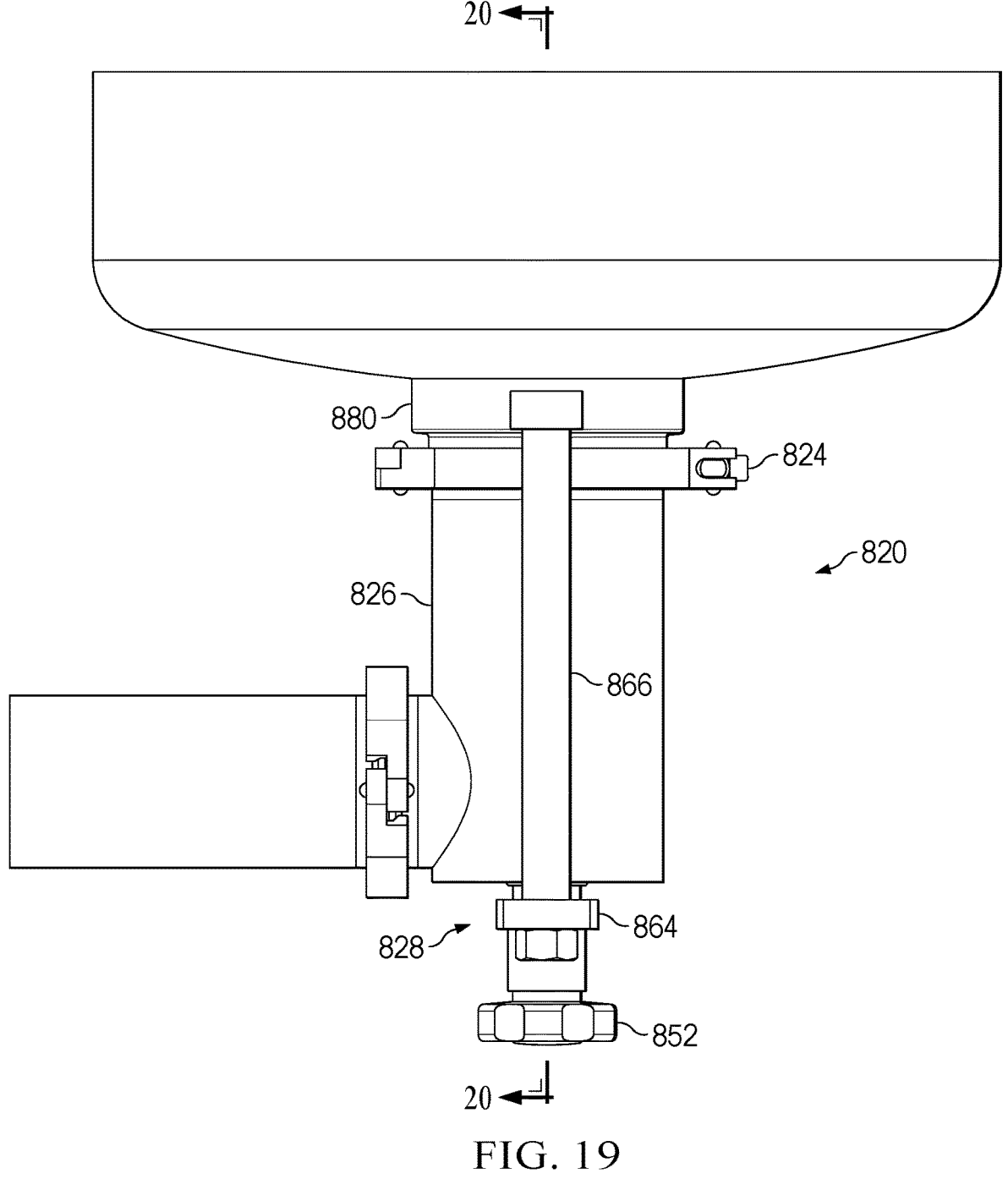
FIG. 19 is a side view of the fitting assembly and the containment vessel of FIG. 18.
Figure 20:
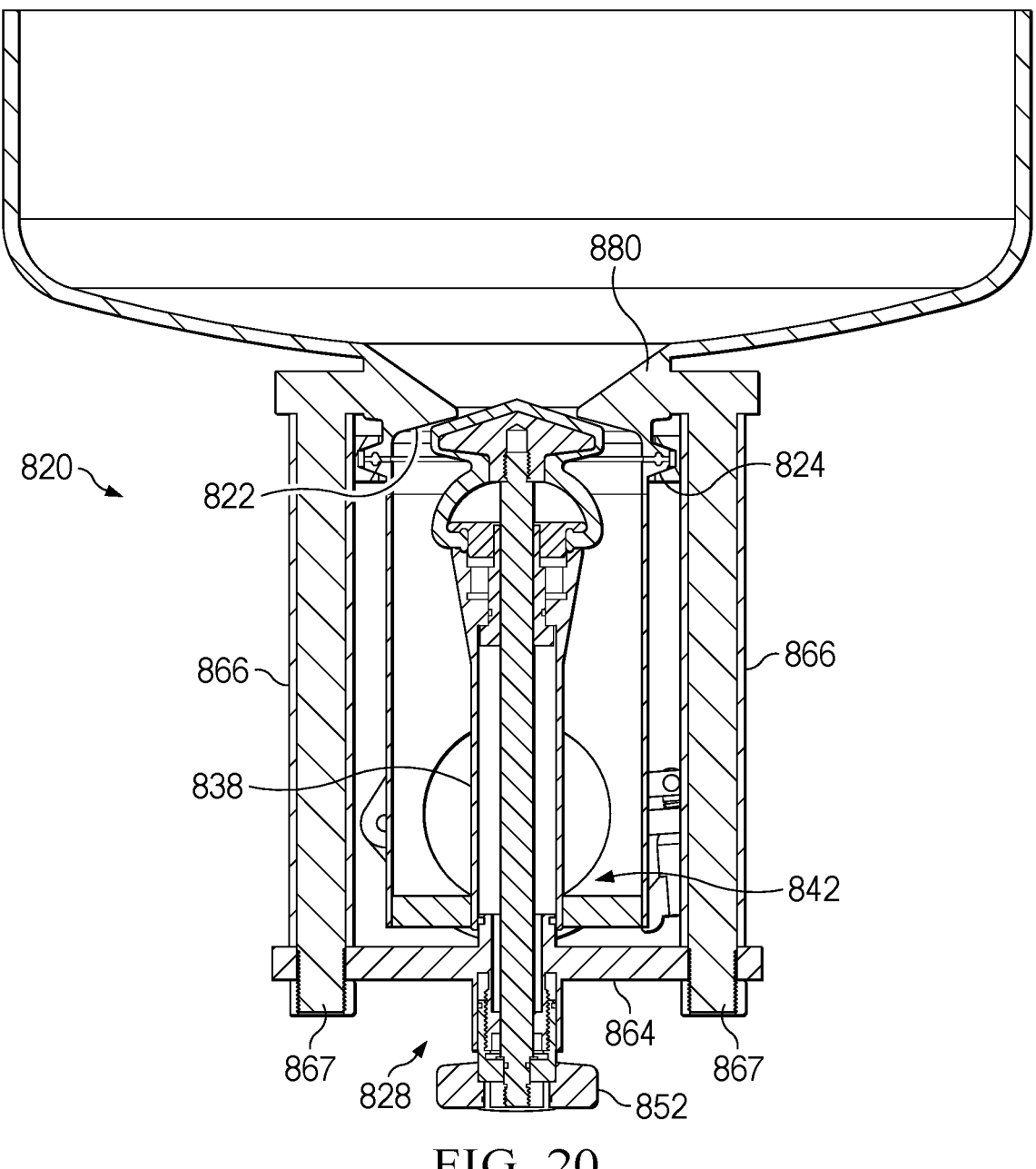
FIG. 20 is a cross sectional view taken along the line 20-20 in FIG. 19.

An alternative embodiment of a fitting assembly 820 is illustrated in FIGS. 18-20 and can be similar to, or the same in many respects as, the fitting assembly 220 illustrated in FIGS. 7A, 7B, and 8. For example, the fitting assembly 820 can include a fitting body 826 and a valve assembly 828. The valve assembly 828 can include a hollow pedestal 838 (FIG. 20) and a handle 852 disposed at a lower end 842 of the hollow pedestal 838. The fitting body 826 can be secured to an upper valve body 822 (FIG. 20) with a clamp 824. The fitting assembly 820 can include a flange 864 that is slidably coupled with the lower end 842 of the hollow pedestal 838. A pair of sleeve members 866 can be disposed on opposing sides of the fitting body 826. However, a collar member 880 can be coupled with the upper valve body 822 and the sleeve members 866 can be coupled with the flange 864 and the collar member 880 (e.g., with fasteners 867) such that the force imparted to the handle 852 during actuation of an actuator shaft 844 can be borne (e.g., substantially or entirely) by the upper valve body 822 (e.g., via the collar member 880). As such, at least some of the axial forces imparted to the handle 852 during actuation can be imparted to the collar member 880 largely bypassing the fitting body 826 and the hollow pedestal 838 such that the fitting body 826 and the hollow pedestal 838 are less susceptible to failure during actuation of the handle 852.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A fitting assembly comprising:
a fitting body defining a fluid inlet, a fluid outlet, a passageway extending between the fluid inlet and the fluid outlet, and a valve opening disposed between the fluid inlet and the fluid outlet; and
a valve assembly comprising:
a hollow pedestal comprising an upper end and a lower end, the hollow pedestal disposed in the valve opening such that the upper end is disposed in the passageway and the lower end is external to the passageway;
an actuator shaft disposed in the hollow pedestal and movably coupled with the hollow pedestal and movable between an extended position and a retracted position;
a sealing member coupled with the actuator shaft adjacent to the upper end and at least partially movable together with the actuator shaft, the sealing member configured to selectively interface with an upper valve body to provide a seal therebetween;
an actuator operably coupled with the actuator shaft adjacent the lower end and operable to facilitate movement of the actuator shaft between the extended position and the retracted position, wherein the fitting body and the hollow pedestal are formed of a multi-piece construction and are joined together at the valve opening; and
a bracing assembly that is configured to transfer forces at the actuator away from the hollow pedestal, wherein the bracing assembly comprises:
an upper brace secured to the fitting body at the fluid inlet;
a lower brace coupled with the lower end of the hollow pedestal; and
a pair of sleeve members, each sleeve member of the pair of sleeve members coupled to each of the upper brace and the lower brace and disposed on opposing sides of the fitting body.

2. The fitting assembly of claim 1 wherein the fitting body and the hollow pedestal are joined together through welding.

3. The fitting assembly of claim 1 wherein the fitting body comprises one of an elbow fitting, a three-way fitting, a four-way fitting, and a five-way fitting.

4. The fitting assembly of claim 1 wherein the upper brace comprises a clamp and the lower brace comprises a flange coupled with the actuator and the lower end of the hollow pedestal.

5. The fitting assembly of claim 1 wherein the fitting body is joined directly to the hollow pedestal at the valve opening.

6. The fitting assembly of claim 1 wherein the actuator shaft is slidably coupled with the hollow pedestal and is slidable between the extended position and the retracted position.

7. The fitting assembly of claim 6 wherein the actuator comprises a handle that is rotatably coupled with the hollow pedestal and facilitates manual sliding of the actuator shaft between the extended position and the retracted position.

8. The fitting assembly of claim 1 wherein the fitting body further comprises a collar at the fluid inlet that facilitates selective coupling of the fitting body with an upper valve body.

9. The fitting assembly of claim 8 further comprising a reinforcing member that is coupled with each of the collar and the lower end of the hollow pedestal.

10. The fitting assembly of claim 1 wherein the sealing member is further coupled with the upper end of the hollow pedestal.

11. The fitting assembly of claim 10 wherein the sealing member is a diaphragm.

12. The fitting assembly of claim 1 further comprising a weld plate and wherein each of the hollow pedestal and the fitting body are joined to the weld plate.

13. The fitting assembly of claim 12 wherein the fitting body comprises an elbow fitting and the weld plate has a substantially wedge-shaped cross section.

14. The fitting assembly of claim 12 wherein the fitting body comprises a three-way fitting and the weld plate has a substantially triangular-shaped cross section.

15. The fitting assembly of claim 12 wherein the fitting body comprises a five-way fitting and the weld plate has a substantially flat-shaped cross section.

16. A kit comprising:
an upper valve body;
a fitting assembly comprising:
a fitting body defining a fluid inlet, a fluid outlet, a passageway extending between the fluid inlet and the fluid outlet; and
a valve assembly comprising:
a hollow pedestal comprising an upper end and a lower end, the hollow pedestal coupled with the fitting body such that the upper end is disposed in the passageway and the lower end is external to the passageway;
an actuator shaft disposed in the hollow pedestal and movably coupled with the hollow pedestal and movable between an extended position and a retracted position;
a sealing member coupled with the actuator shaft adjacent to the upper end and at least partially movable together with the actuator shaft, the sealing member configured to selectively interface with the upper valve body to provide a seal therebetween; and
an actuator operably coupled with the actuator shaft adjacent the lower end and operable to facilitate movement of the actuator shaft between the extended position and the retracted position;
a coupling that releasably secures the fitting body to the upper valve body at the fluid inlet such that the sealing member selectively contacts the upper valve body when the actuator shaft is moved between the extended position and the retracted position;
a collar coupled with the upper valve body above the coupling; and
a bracing assembly coupled with the collar and being configured to transfer forces at the actuator away from the hollow pedestal and to the collar.

* * * * *